United States Patent [19]

Croisier et al.

[11] 3,822,404

[45] July 2, 1974

[54] DIGITAL FILTER FOR DELTA CODED SIGNALS

[75] Inventors: Alain Croisier, Cagnes-sur-Mer; Vladimir Riso, Nice, both of France

[73] Assignee: International Business Machines Corporation, Armonk, N.Y.

[22] Filed: Oct. 18, 1971

[21] Appl. No.: 189,974

[30] Foreign Application Priority Data

Oct. 29, 1970 France .............................. 70.40291

[52] U.S. Cl. ................ 325/38 B, 235/152, 235/156

[51] Int. Cl. ............................................ H04b 7/00

[58] Field of Search ........ 325/38 B, 42; 235/92 CA, 235/152, 156

[56] References Cited

UNITED STATES PATENTS

| | | | |
|---|---|---|---|
| 2,916,553 | 12/1959 | Crowley | 325/38 B |
| 3,530,381 | 9/1970 | Hogg | 235/92 CA |
| 3,619,583 | 11/1971 | Arnold | 235/152 |
| 3,648,171 | 3/1972 | Hirsch | 325/42 |
| 3,683,162 | 8/1972 | Jacob | 235/156 |

*Primary Examiner*—Raulfe B. Zache
*Assistant Examiner*—Robert F. Gnuse

[57] ABSTRACT

A recursive digital filter comprising a digital accumulator for algebraically adding successive modified digital delta coded signals extracted from a memory medium, the memory medium storing said modified digital signals, the memory further being directly addressed by a predetermined number of digital signals fed back from the accumulator.

2 Claims, 13 Drawing Figures

INVENTORS
ALAIN CROSSIER
VLADIMIR RISO

BY Robert Bruce Brodie
ATTORNEY

DELTA CODED INPUT SIGNAL TO THE FILTER
AS GENERATED BY CODER IN FIG. 1

| ROM ADDRESS | | | | | | ROM CONTENTS | ROM CONTENTS WITH $a_0=1; a_1=-1; a_2=2; b_0=0; b_1=-4; b_2=3$ | |
|---|---|---|---|---|---|---|---|---|
| $Y_N$ | $Y_{N-1}$ | $Y_{N-2}$ | $Z_N$ | $Z_{N-1}$ | $Z_{N-2}$ | | IN 2'S COMPLEMENT CODE | IN DECIMAL CODE |
| 0 | 0 | 0 | 0 | 0 | 0 | 0 | 00000 | 0 |
| 0 | 0 | 0 | 0 | 0 | 1 | $a_0$ | 00001 | 1 |
| 0 | 0 | 0 | 0 | 1 | 0 | $a_1$ | 11111 | -1 |
| 0 | 0 | 0 | 0 | 1 | 1 | $a_1+a_0$ | 00000 | 0 |
| 0 | 0 | 0 | 1 | 0 | 0 | $a_2$ | 00010 | 2 |
| 0 | 0 | 0 | 1 | 0 | 1 | $a_2+a_0$ | 00011 | 3 |
| 0 | 0 | 0 | 1 | 1 | 0 | $a_2+a_1$ | 00001 | 1 |
| 0 | 0 | 0 | 1 | 1 | 1 | $a_2+a_1+a_0$ | 00010 | 2 |
| 0 | 1 | 0 | 0 | 1 | 0 | $a_1+b_1$ | 11011 | -5 |
| 0 | 1 | 1 | 0 | 0 | 1 | $a_0+b_1-1$ | 11100 | -4 |
| 1 | 1 | 1 | 1 | 1 | 1 | $a_0+a_1+a_2+b_0+b_1+b_2-1$ | 00000 | 0 |

FIG. 10B

| TIME | $Y_N$ | ADDRESS REG | | | | | | ROM CONTENTS | ACCU | | $Z_{N+1}$ |
|---|---|---|---|---|---|---|---|---|---|---|---|
| | | $Y_N$ | $Y_{N-1}$ | $Y_{N-2}$ | $Z_N$ | $Z_{N-1}$ | $Z_{N-2}$ | | IN DECIMAL CODE | IN 2'S COMPLEMENT | |
| $t_0$ | 0 | 0 | 0 | 0 | 0 | 0 | 0 | 00000 | 0 | 00000 | 0 |
| $t_1$ | 1 | 0 | 0 | 0 | 0 | 0 | 1 | 00001 | 0+1=1 | 00001 | 1 |
| $t_2$ | 1 | 0 | 0 | 1 | 0 | 1 | 1 | 11111 | 1-1=0 | 00000 | 0 |
| $t_3$ | 1 | 0 | 1 | 0 | 1 | 1 | 1 | 11110 | 0-2=-2 | 11110 | 0 |
| $t_4$ | 1 | 1 | 0 | 0 | 1 | 1 | 1 | 00101 | -2+5=3 | 00011 | 1 |
| $t_5$ | 0 | 0 | 0 | 1 | 1 | 1 | 0 | 00000 | 3+0=3 | 00011 | 1 |
| $t_6$ | 1 | 0 | 1 | 1 | 1 | 0 | 1 | 11110 | 3-2=1 | 00001 | 1 |
| $t_7$ | 0 | 1 | 1 | 1 | 0 | 1 | 0 | 11101 | 1-3=-2 | 11110 | 0 |
| $t_8$ | 1 | 1 | 1 | 0 | 1 | 0 | 1 | 00010 | -2+2=0 | 00000 | 0 |
| $t_9$ | 0 | 1 | 0 | 0 | 0 | 1 | 0 | 00010 | 0+2=2 | 00010 | 1 |
| $t_{10}$ | 0 | 0 | 0 | 1 | 1 | 0 | 0 | 00001 | 2+1=3 | 00011 | 1 |
| $t_{11}$ | 1 | 0 | 1 | 1 | 0 | 0 | 1 | 11100 | 3-4=-1 | 11111 | 0 |

FIG. 11A

| ADDRESS REG 2 | | | ROM2 | | ADDRESS REG 1 | | | ROM1 | |
|---|---|---|---|---|---|---|---|---|---|
| $Z_{N-2}$ | $Z_{N-1}$ | $Z_N$ | DECIMAL | 2'S COMPLEMENT | $Y_{N-2}$ | $Y_{N-1}$ | $Y_N$ | DECIMAL | 2'S COMPLEMENT |
| 0 | 0 | 0 | 0 | 0 0 0 0 | 0 | 0 | 0 | 0 | 0 0 0 0 |
| 0 | 0 | 1 | -1 | 1 1 1 1 | 0 | 0 | 1 | 1 | 0 0 0 1 |
| 0 | 1 | 0 | -4 | 1 1 0 0 | 0 | 1 | 0 | -1 | 1 1 1 1 |
| 0 | 1 | 1 | -5 | 1 0 1 1 | 0 | 1 | 1 | 0 | 0 0 0 0 |
| 1 | 0 | 0 | 3 | 0 0 1 1 | 1 | 0 | 0 | 2 | 0 0 1 0 |
| 1 | 0 | 1 | 2 | 0 0 1 0 | 1 | 0 | 1 | 3 | 0 0 1 1 |
| 1 | 1 | 0 | -1 | 1 1 1 1 | 1 | 1 | 0 | 1 | 0 0 0 1 |
| 1 | 1 | 1 | -2 | 1 1 1 0 | 1 | 1 | 1 | 2 | 0 0 1 0 |

FIG. 11B

| TIME | $X_N$ | ADDRESS REG 2 | | | ROM2 | ADDRESS REG 1 | | | ROM1 | ADDER ROM 1 + ROM2 | ACCU | $Z_{N+1}$ |
|---|---|---|---|---|---|---|---|---|---|---|---|---|
| | | $Z_{N-2}$ | $Z_{N-1}$ | $Z_N$ | | $Y_{N-2}$ | $Y_{N-1}$ | $Y_N$ | | | | |
| $t_0$ | 0 | 0 | 0 | 0 | 0 0 0 0 | 0 | 0 | 0 | 0 0 0 0 | 0 0 0 0 0 | 0 0 0 0 0 | 0 |
| $t_1$ | 1 | 0 | 0 | 0 | 0 0 0 0 | 0 | 0 | 1 | 0 0 0 1 | 0 0 0 0 1 | 0 0 0 0 1 | 1 |
| $t_2$ | 1 | 0 | 0 | 1 | 1 1 1 1 | 0 | 1 | 1 | 0 0 0 0 | 1 1 1 1 1 | 0 0 0 0 0 | 0 |
| $t_3$ | 1 | 0 | 1 | 0 | 1 1 0 0 | 1 | 1 | 1 | 0 0 1 0 | 1 1 1 1 0 | 1 1 1 1 0 | 0 |
| $t_4$ | 1 | 1 | 0 | 0 | 0 0 1 1 | 1 | 1 | 1 | 0 0 1 0 | 0 0 1 0 1 | 0 0 0 1 1 | 1 |
| $t_5$ | 0 | 0 | 0 | 1 | 1 1 1 1 | 1 | 1 | 0 | 0 0 0 1 | 0 0 0 0 0 | 0 0 0 1 1 | 1 |
| $t_6$ | 1 | 0 | 1 | 1 | 1 0 1 1 | 1 | 0 | 1 | 0 0 1 1 | 1 1 1 1 0 | 0 0 0 0 1 | 1 |
| $t_7$ | 0 | 1 | 1 | 1 | 1 1 1 0 | 0 | 1 | 0 | 1 1 1 1 | 1 1 1 0 1 | 1 1 1 1 0 | 0 |
| $t_8$ | 1 | 1 | 1 | 0 | 1 1 1 1 | 1 | 0 | 1 | 0 0 1 1 | 0 0 0 1 0 | 0 0 0 0 0 | 0 |
| $t_9$ | 0 | 1 | 0 | 0 | 0 0 1 1 | 0 | 1 | 0 | 1 1 1 1 | 0 0 0 1 0 | 0 0 0 1 0 | 1 |
| $t_{10}$ | 0 | 0 | 0 | 1 | 1 1 1 1 | 1 | 0 | 0 | 0 0 1 0 | 0 0 0 0 1 | 0 0 0 1 1 | 1 |
| $t_{11}$ | 1 | 0 | 1 | 1 | 1 0 1 1 | 0 | 0 | 1 | 0 0 0 1 | 1 1 1 0 0 | 1 1 1 1 1 | 0 |

DIGITAL FILTER FOR DELTA CODED SIGNALS

BACKGROUND OF THE INVENTION

This invention relates to the digital filtering of delta coded signals, and more particularly, to the digital filtering of delta coded signals by recursive filtering means.

Let us recall from the prior art as for example found in U.S. Pat. No. 2,916,553 issued to T. H. Crowley on Dec. 8, 1959, that a delta coded digital sequence, unlike digital sequences generally, does not consist of wholly random runs of 1's and 0's. Significantly, the bits in each delta coded run bear a relationship one to the other. The consecutive bits in each delta coded run constitute unit step changes in the slope of a time varying analog signal from sampling instant to sampling instant. If given a single valued continuous function $y = f(t)$, which function is sampled at a sufficiently high rate, then the value assigned to the change $\Delta y$ at sampling instant $i$ is either a "1" or a "0" depending upon whether $y_i > y_{i-1}$ or $y_i \leq y_{i-1}$. Accordingly, for $y_1 > y_{i-1}$, then $\Delta y_i = 1$ and for $y_i \leq y_{i-1}$ $\Delta y_i = 0$. A succession of signals $\Delta y_1$, $\Delta y_2$, $\Delta y_3$ represented by a run of ones (1, 1, 1, 1) means that the magnitude of the slope of the signal is increasing at a rate at least as equal to the sampling rate. Similarly, a succession of delta coded zeros (0, 0, 0, 0) represents a slope continuously decreasing at a rate at least equal to the sampling rate. On the other hand, a run of alternating ones and zeros (0, 1, 0, 1) indicate that the slope is not changing. Thus, by using delta coded signals instead of analog magnitudes, it is possible to operate on the signals with binary circuits. It is also possible to recover the analog value by integrating a run using a low pass filter.

It is desired for many signal processing purposes to alter or modify the shape of one or more signals in a sequence. To perform such an operation in the time domain, filters of the transversal type have long been used. They comprise a delay element into which the signals of interest are serially applied, the delay element being tapped at periodic intervals along the delay element extent. Additionally, individual elements of a resistive summing network couple corresponding taps and provide therefore an output at any point in time of the sum of input signals stored in the delay as altered according to the values of the resistive digital elements. In the usual digital implementation, the delay of the transversal filter is replaced by a multi stage shift register to which the digital signals may be applied at a frequency corresponding to the shift rate. Thus, it is understood that for a succession of delta coded signals $\Delta y_1, \Delta y_2, \Delta y_3 - \Delta y_m$ present in a shift register of $j$ stages, then the value of an output signals $Z$ at the $i^{th}$ time interval is $$Z_i = h_1\,\Delta y_1 + h_2\,\Delta y_2 + \;-\; + \mathrm{h}_m\,\Delta y_m = \sum_m h\Delta y.$$

Recognition is accorded to the fact that such time domain filters could be made so as to feed back a portion of their output to the input and thus be suitable for implementing "recursive" filter functions. Indeed, some time domain filters of either the non-recursive (transversal) or recursive form are quite complex. They may be found in the adaptive equalizers on data channels or in threshold detectors of correlation radar receivers for the purpose of extracting a signal in the presence of noise. Suffice to say that the most significant performance and cost elements of such filters resided in the "multiplier," i.e., the element which altered a signal value by a weighting factor or coefficient.

L. B. Jackson in U.S. Pat. No. 3,522,546, filed Feb. 29, 1968 recognized the desirability of minimizing the expense of multipliers in "digital filters" and proposed embodiments to reduce their number. Jackson disclosed the use of a read only memory as a convenient source of coefficient multiplicands. This memory together with appropriate timing circuits and the input signal as a multiplier, were simultaneously applied to an appropriate product forming element. In Jackson, a digital filter product forming element was repetitively used on each encoded input sample, with the multiplicands from the read only memory (ROM) being changed with each use.

A. J. Deerfield in U.S. Pat. No. 3,370,292 issued on Feb. 10, 1968 treated the problem of altering the coefficients of the multiplier elements of a digital recursive filter used as a signal threshold detecting element. Deerfield summarized a digital canonic filter as including a first signal combining element to which the filter input signal $V_{in}$ would be applied and from which a value $X$ would be extracted according to the relation $X_N = V_{in} + B_1 X_{N-1} + B_2 X_{N-2}$. $B_1 + B_2$ are multiplier coefficients for the value $X$ occurring at prior times N−1 and N−2 respectively. The filter further included a second signal combining element from which the filter input $V_{out}$ would be obtained from values of $X$ according to the relation $V_{out} = A_O X_N + A_1 X_{N-1} + A_2 X_{N-2}$. $A_0$, $A_1$, $A_2$ also are multiplier coefficients. Deerfield's system contemplated using the same arrangement of signal combining elements, feedforward, and feedback paths. However, he used a table look-up device addressed by successive values of $X$ for obtaining the coefficients $B_1 + B_2$ for the feedback path of the first signal element and the coefficients $A_0$, $A_1$, $A_2$, for the feed forward path.

How may the prior art be summarized? It is believed fair to state that the use of recursive or canonic arrangements for filtering certain types of digital signals (PCM) or radar pulse signals was well understood. It was further understood that such time domain filters used fixed coefficient multiplier elements i.e., $h_1\,\Delta y_1$; $B_1\,X_{N-1}$. In an attempt to reduce the cost and/or increase the flexibility of such multiplier elements one system used a read only memory to supply coefficient values in a predetermined sequence, i.e., Jackson. Another system provided for true flexibility by having an intermediate filter signal address a memory for obtaining coefficient values, i.e., Deerfield. Although digital delta coding was known, i.e., Crowley, there was no disclosure of the flexible digital filtering of such delta coded sequences.

SUMMARY OF THE INVENTION

The invention contemplates a recursive digital filter comprising an accumulator output stage for algebraically combining digital delta coded signals; memory means for storing digitally delta coded signals in $2^N$ addressable memory locations; and means jointly responsive to $m$ consecutive digital delta coded input signals and $r$ digitally coded signals from the accumulator for extracting from the memory means the contents stored at the memory location whose address is defined by the $m + r = N$ signals. The filter further includes means for applying the extracted contents to the accumulator. In this regard, filtering of a digital signal especially taking into account the aforementioned sequence dependent properties of delta code are entirely made a matter of table look up. Advantageously, $m$ delta coded digits applied at the input together with $r$ digits feed back from an accumulator directly address the memory. It is not necessary therefore to rely upon, as is the case of the prior art, the use of an elaborately processed intermediate signal addressing a memory one signal at a time.

In a second embodiment, the absolute size of the memory means is reduced by providing two smaller capacity and independently addressable memories driving the accumulator. One memory readable by $m$ input delta coded digits at a time possesses a capacity of $2^m$, while the other memory readable by $r$ digits fed back from the accumulator has a capacity of $2^n$. The capacity of this arrangement reduces the memory size by $2^{m+r} - [2^m + 2^r]$.

In this invention, it is understood that the accumulator functions as the integrating element commonly found in both transversal and recursive time domain filters. The increment of the signal representatively modified by the filter is extracted from the memory and added to the accumulator, the increment being extracted from the location whose address comprises consecutive input digits $y_N$, $y_{N-1}$, $y_{N-2}$ and consecutive filter output digits $Z_N$, $Z_{N-1}$, $Z_{N-2}$, the filter relation being of the form $$Z_N = a_0\, y_N + a_1\, y_{N-1} + a_2\, y_{N-2} + b_0\, Z_N + b_1\, Z_{N-1} + b_2\, Z_{N-2}.$$

BRIEF DESCRIPTION OF THE DRAWING

FIGS. 11A and B tabularly set forth memory addressing, organization and accumulator response in the time domain in the filter embodiment shown in FIG. 6.

DESCRIPTION OF THE PREFERRED EMBODIMENTS

Figure 1:
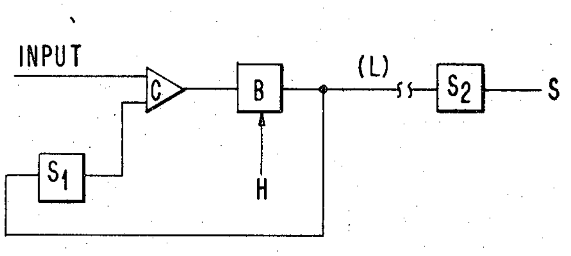
FIG. 1 PRIOR ART
FIG. 1 shows a delta encoder of the prior art.

In a delta modulated transmission encoding of the prior art, the analog signal is sampled at regular intervals of period T. The input signal is approximated by the transmission of "1" or "0" indicating that the approximation is negative or positive. Therefore, the encoder includes, as indicated in FIG. 1, a differential comparator (C) driving a binary trigger (B) controlled by a clock (H) of period T, the output of which is connected to transmission line (L). The signal to be coded is introduced on one of the comparator input terminals; the other input terminal receives the integral S1 of the delta coded binary signal representing the analog level reached by accumulating and memorizing the preceding levels. At each sampling time, the encoder delivers a binary "1" or "0" as the difference of the signals at the comparator inputs is positive or negative. Thus, a very simple coding of the input signal is obtained, in which all bits have same weight. In addition, the decoding of such an information may be obtained by using an integrator S2. Thus, the modem (modulator-demodulator) so obtained is very simple.

Figure 2:
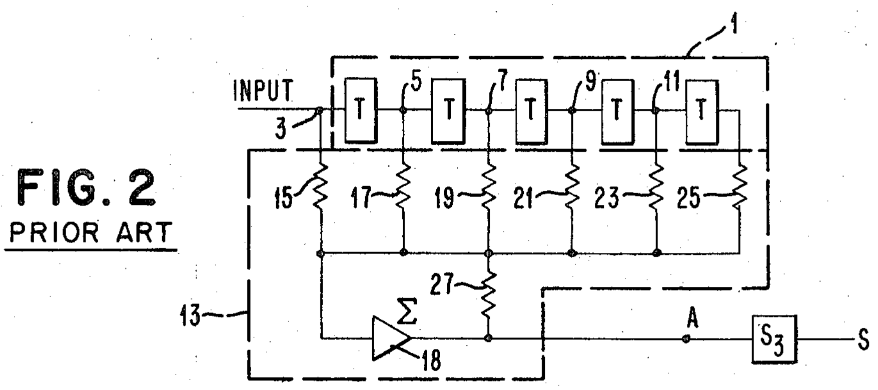
FIG. 2 PRIOR ART
FIG. 2 shows the diagram of a transversal filter operating on delta coded signals.

A delta coded signal may be filtered by using a device called transversal filter of FIG. 2. The transversal filters are known in the prior art and mainly consist of a delay line or a shift register 1 including several intermediate taps 3, 5, 7, 9 and 11, the signals of which are weighted and added in a summing stage 13. These operations can be carried out by using resistors 15–27 and an operational amplifier 18 or by using a computer. The filtered delta coded signal $s(t)$ appears at point A as multilevel pulses and an integrator S3 is sufficient to deliver, at S, the filtered analog signal. It should be added that the shift registers can be connected to reverse the signal when this is necessary and that negative weightings can be obtained through this method. The same case will appear in the circuits which will be described later.

Figure 3:
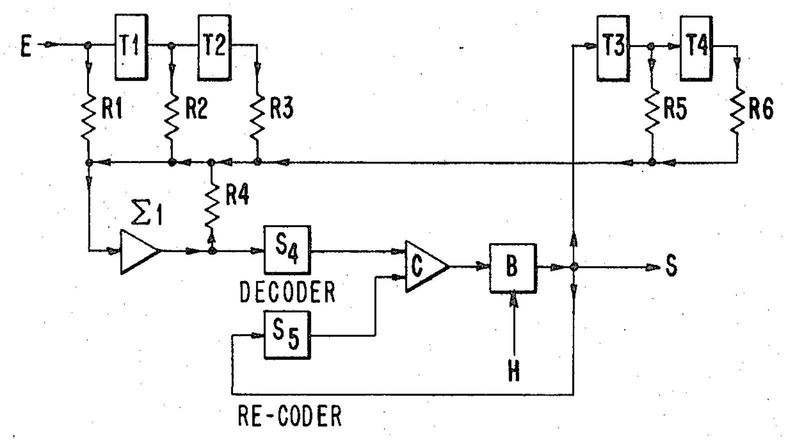
FIG. 3 shows the diagram of a recursive filter operating on delta coded signals according to the invention.

To change this transversal filter into a recursive filter, it is sufficient to add a second transversal filter constituting a feedback section. Then, the analog signal at S should be recoded into delta. This is carried out by the circuit of FIG. 3 in which the digital signal introduced in E is subjected to a first direct transversal filtering by a device including cells T1 and T2 each one shifting the binary signal by a time T equal to the sampling period, weighting resistors R1, R2, R3, R4 and operational amplifier Σ1 summing the weighted levels applied to its input. Then the signal is subjected to a second feedback transversal filtering using cells T3, T4, resistors R5, R6, R4 and same amplifier Σ1. The feedback filter receives, at its input, the signal delivered by said direct filter converted into an analog form by S4 and delta recoded by means of encoder S5, C, B similar to the one of the FIG. 1.

In fact, the coding operation requires three successive operations, namely: integration in S4, difference in C and integration in S5. These operations are commutative. In the same way, the filtering operation itself may be carried out at any time of the process corresponding to the various sequential operations performed on the initial signal. Therefore, the delta coded signal at output S, instead of being added to the level memorized in S5, then compared to the level from S4, may be as well subtracted from S4, then the result may be compared to the zero voltage level (sign detection). Now the design of the recursive filter enables to carry out these operations at low cost due to said filter feedback section. As a matter of fact, the existence of the loop connecting output S to the integrator S4 through operational amplifier Σ1 enables the use of this stage for adding the signal at S, after its reversal by an appropriate connection of trigger B. Therefore, decoder S4 will carry out operation S4-S5 of which it is sufficient to detect the sign to obtain the desired information. All this is carried out by the circuit shown on FIG. 4 deducted from the one of FIG. 3 by deletion of S5, connection of the corresponding terminal of comparator C to the ground potential, and insertion of a resistor $R = R4$. The delta coded signal appearing in S is thus reversed by using circuit *R*, *R*4, Σ1, then added to the one stored in S4 prior to being compared to the zero reference level for delta recoding. This recoded signal is also transmitted to the filter feedback loop.

Figure 5:
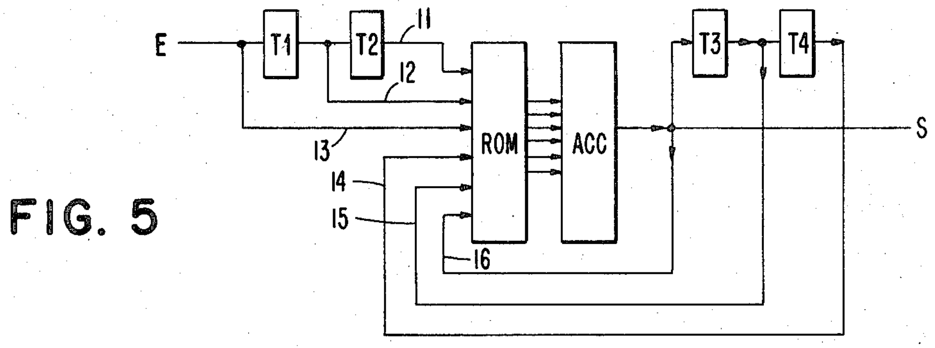
FIGS. 5 and 6 show the diagram of digital embodiments of the simplified recursive delta filter.

Referring now to FIG. 5, there is shown a digital filter according to the invention comprising delay cells T1 and T2 on the direct path of the delta coded signal and cells T3, T4 on the feedback path. In fact, the number of cells only depends on the required filter transfer function and is theoretically not restrictive. The two-cells limit for each channel enables more simple diagrams and explanations.

Figure 4:
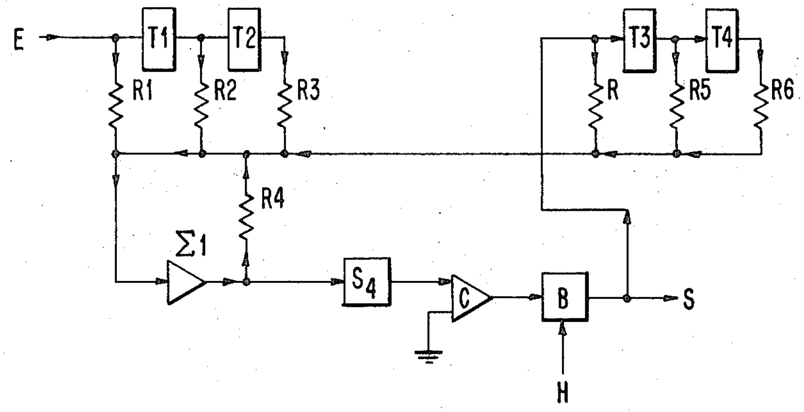
FIG. 4 depicts s simplified recursive filter derived from the previous figure according to the invention.

Due to binary coding, stage S4 of FIG. 4, when N is equal to the number of weighting resistors, can only receive as inputs $2^N$ various levels corresponding to the values of Σ(ai/Ri). The ai represents the binary values stored in respective cells T and Ri, the values of the corresponding weighting resistors. Referring again to FIG. 5, it should be observed that it is possible to store, in the case chosen as an example, 64 words corresponding to $2^N$ combinations, in a read only memory (ROM). At each sampling time, the contents of the ROM are addressed by signals appearing on lines 11 to 16. The selected word is transferred from the ROM and added to the preceding operations stored in the accumulator stage ACC. Therefore, the sign of the ACC contents appearing at output S, contains the wanted filtered delta coded information.

It should be recalled that for a succession of delta coded input digits $y_N$, $y_{N-1}$, $y_{n-2}$ the output of a time domain filter can be related thereto by $Z_N = a_0 y_N + a_1 y_{N-1} + a_2 y_{N-2}$. Referring now to FIG. 5, the delay elements T3 and T4 contain respectively at any one instant of time the prior outputs $Z_{N-1}$ and $Z_{N-2}$. These outputs are also applied to the ROM and can be related to $Z_N$ by the relation $Z_N = a_0 y_N + a_1 y_{N-2} + b_0 Z_N + b_1 Z_{N-1} + b_2 Z_{N-2}$. Now, the question arises as to how $Z_{N+1}$ is derived. This is obtained merely by detection of the SIGN of the accumulator contents of $Z_N$. Thus, symbolically if $$\text{SGN } Z_N > 0, \text{ then } Z_{N+1} = 1$$

$$\text{SGN } Z_N \leq 0, \text{ then } Z_{N+1} = 0$$

In the embodiment shown in FIG. 5, the ROM need only be addressed by the word $[y_N, y_{N-1}, y_{N-2}, Z_N, Z_{N-1}, Z_{N-2}]$ in order to obtain $Z_N$. This results if the ROM stores all possible combinations, of filter coefficients $(a_i, b_i, z_i, y_i)$ deriving from the relation $Z_n$. The parameters $a_i$ and $b_i$ being the filter coefficients depend only upon the desired transfer function. This means that the ACC functions only as a sign determining device for the computation of $Z_{N+1}$.

Figures 9, 10A:
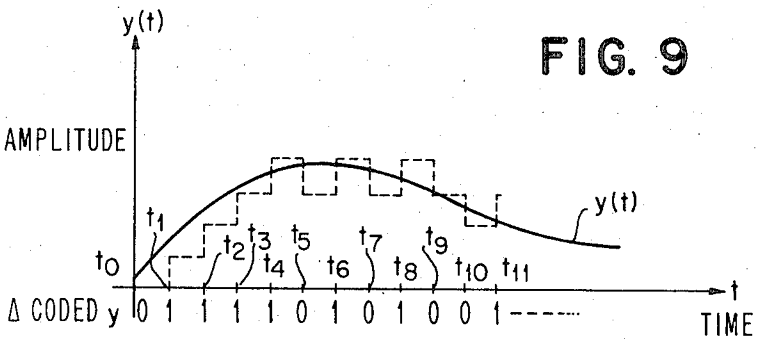
FIG. 9 is the typical curve following action of a delta coder.
FIGS. 10A and B tabularly set forth the memory addressing organization and accumulator response in the time domain of the filter embodiment shown in FIG. 5.

Referring now to FIG. 9 there is shown a typical continuous function of time $y(t)$. Also shown in dotted line is the curve following action of the delta coder in FIG. 1. If the integrated output at any sampling instant is less than the actual magnitude, then a binary 1 is generated. If the integrated output is greater than the actual magnitude, then the coder provides a binary 0.

The operation of this filter is therefore very easy to understand by looking at said FIG. 10A and FIG. 5: the successive incoming bits representing the delta coded input signal from FIG. 9 are fed into the shift register T1, T2, while the output bits representing the delta coded output signal are fed through T3, T4. Consequently, at each bit time, the address word $Y_N\ Y_{N-1}\ Y_{N-2}\ Z_N\ Z_{N-1}\ Z_{N-2}$ available at the ROM address input, fetches one word out of said ROM, which word is accumulated into ACC, the sign of the contents of which is then used to provide $Z_{N+1}$, and so on.

For instance, if the filter coefficients derived from the required transfer function are: $a_0 = 1$; $a_1 = -1$; $a_2 = 2$; $b_1 = -4$ and $b_2 = +3$, then the ROM contents coded in two's complement code are as disclosed in table 1, column 3. In this specific case, the numbers which must be stored in the ROM are between 0 1 0 0 0 and 1 1 1 0 0 in 2's complement code (+8, −4 in decimal). Consequently, each ROM location should be able to store a 5 bit byte.

Let's suppose that an analog signal $y(t)$ as represented on present FIG. 9 is to be filtered. Such a signal is in fact provided to the filter input in delta code, i.e., as a train of "1" and "0," representing the sign of the increment of each $y(t)$ sample, when said $y(t)$ is sampled at frequency $1/T$. The filter is initially reset, therefore, at $t_0 = 0$, the ROM address is 0 0 0 0 0 0, the ACCU contents is 0 0 0 0 0, the sign detection feature provides $Z_1 = 0$. At $t_1 = T$, $y_1 = 1$, then the new address word is therefore 0 0 0 0 0 1. The contents of that address consist of a new byte equal to 0 0 0 0 1 (corresponding to the decimal value of $a_0 = +1$) out of the ROM. Said new byte is accumulated into ACCU and the sign detection provides $Z_2 = 1$. At $t_2 = 2T$, then $y_2 = 1$. The address word is 0 0 1 0 1 1 which fetches $-1+2_1+a_0 = -1$ in decimal or 1 1 1 1 1 in 2's complement code. This new byte is added to ACCU contents which contents become then $+1-1 = 0$, coded 0 0 0 0 0; and the sign detection provides $Z_3 = 0$ and so on.

Reference should be made to FIG. 10B for input/output response of the filter to successive inputs *y* and output *z* for the coefficient set defined in FIG. 10A. It should be recalled in passing that the 2's complement of a 5 bit binary number may be obtained if the binary number Q lies in the range 0 $Q<\infty$ by inverting the binary digits and adding 1 to the lowest or units position. If $Q$ is in the range $-\infty<Q<0$, then the binary representation is in 2's complement and one must take the 2's complement of the low 2's complement. Thus +5 = 0101 in binary = 1011 in 2's complement. However, −5 = 1011 in 2's complement (binary) = 0101 in 2's complement.

Figure 6:
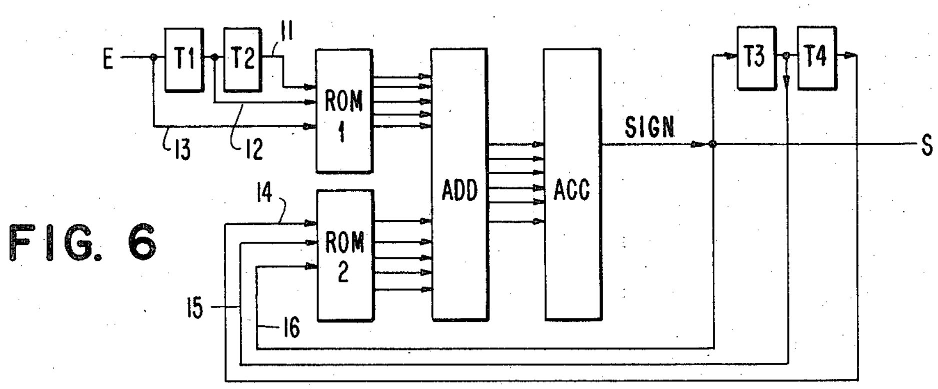

Referring now to FIG. 6, let's just recall that economy of ROM is its main object. The ROM size is related to the number of bits in the address word through the relation: Number of bytes in the ROM = $2^P$ splitting the address word for instance into two parts, each one of P/2 bits. Then the ROM size needed becomes $2 \times 2^{P/2} = 2^{(P/2+1)}$. An additional adder (ADD) is therefore needed. This is self-explanatory since this operation means that instead of computing $a_0 Y_N + a_1 Y_{N-1} + a_2 Y_{N-2} + b_0 z_N + b_1 Z_{N-1} + b_2 X_{N-2}$ through one ROM look up, one finds $a_2 Y_{N-2} + a_2 Y_{N-1} + a_0 X_N$ in $ROM_1$ and $+ b_2 Y_{N-2} + b_1 Y_{N-1} + b_0 Y_N$ in $ROM_2$, and therefore the bytes fetched out of $ROM_1$ and $ROM_2$ must be added together before accumulation into ACCU.

Referring to FIGS. 11A & B, there is shown the memory addressing and organization for the two ROM embodiment of FIG. 6. The same numerical example as the one chosen above is disclosed in FIGS. 11A and 11B. It should be noted that in both embodiments (FIG. 5 and FIG. 6) the delta coded input signal y providing the sequence of bits 0, 1, 1, 1, 1, 0, 1, 0, 1, 0, 0, 1, is filtered into a delta signal $Z$ 0, 1, 0, 0, 1, 1, 1, 0, 0, 1, 1, 0.

It can be advantageous to reduce the ROM dimensions, even if it is necessary to compensate these reductions by complicating the other logic stages. As a matter of fact, the capacity of the memory becomes rapidly unrealizable at competitive prices even for filters which can correspond to actual needs. For a filter, the shifting register of which would include twenty taps, it would be necessary to have an ROM with more than 1,000,000 word positions. In this case, it seems to be better to use the scheme proposed on FIG. 6: the addresses corresponding to the direct section and to the feedback section are processed individually by ROM 1 or ROM 2; then, the results are added in a stage ADD before being transmitted to the accumulator. Thus, the size of the required ROM is quite lower than the previous one since only $2 \times 2^{N/2} = 2{,}000$ positions will be required.

Figure 7:
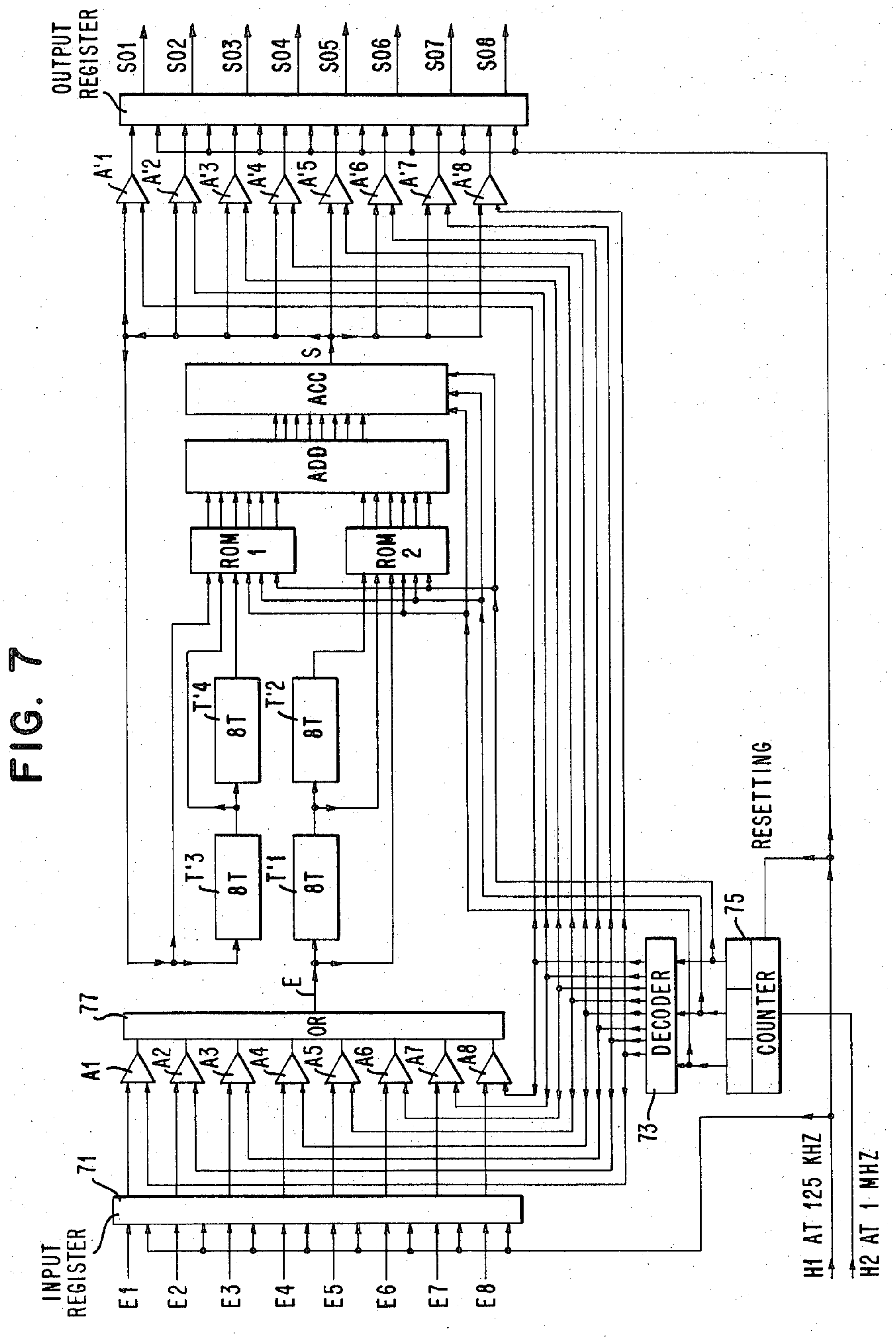
FIG. 7 shows the operating diagram of the recursive delta filter subject of this invention, in a multiplex mode.

In several embodiments, the transmission rates of the delta bits are lower than the operating rates of the circuits obtainable by using known technologies. Therefore, the filter can be multiplexed by $k$ users, $k$ being equal to the ratio of said rates. A preferred embodiment of such a device is shown on FIG. 7. It should be noted that, in addition to the saving which would be due to the use of a same filter in real time by eight different users, the device of this invention may perform, provided that the ROM capacity be slightly increased, a filtering function different for each user or channel, if required.

The device includes an eight binary position input register 71 each receiving one of the inputs E1 to E8 simultaneously controlled in accordance with the rate of application of the data pulses, i.e. 125 KHz. The output of each position of the input register is connected to one of the inputs of an AND gate referenced A1 to A8, the second input of which is controlled by a decoding stage 73 supplied by a three position address counter 75 controlled by a clock H2 at 1MHz; all the outputs of circuits A1 to A8 are connected to input E of the filtering circuit itself, through an OR stage 77. Said filtering circuit is basically the same as the one described with reference to FIG. 6, to which some modifications have been applied to take into account the new operating conditions. As a matter of fact, each cell T1 to T4 has been replaced by an eight-position shifting register, with an overall delay of 8T, references T'1 to T'4 respectively. Besides, to take into account the requirements for obtaining a filtering function different for each input channel, the outputs of the counter intervene also in the addressing of memories ROM1 and ROM2. Then, output S of the filter is demultiplexed using the circuit including gates A'1 to A'8 receiving output S on a first input and one of the decoder outputs on a second input. The outputs of stages A'1 to A'8 respectively load the binary positions of an output register supplying output channels S01 to S08 under control of clock H1 at 125 KHz.

Figure 8:
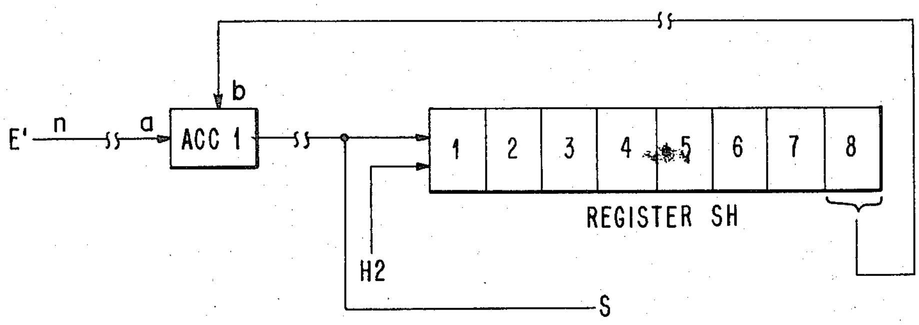
FIG. 8 shows the diagram of the accumulator required for using the filter in multiplex mode.

The operation of the device can be schematically explained as follows. The delta coded data simultaneously arrive every 8 microseconds on inputs E1 to E8 and are loaded in the input register 71 under control of clock H1 at 125 KHz. Then, they are sequentially transmitted every 1 microsecond to input E, under control of clock H2. The selected counter has three binary positions and therefore, can count from one to eight before being reset to zero by the next pulse from H1. The system processes each delta information as it would be done by the circuit of FIG. 6 in non-multiplex mode. In addition, as indicated above, it should be possible to modify the filter characteristics for each processed channel. This explains the use of the counter output. Thus, the use of the binary address of the channel processed at each time H2, to address different memory locations. Then, the contents of stage ADD should be transmitted to the accumulator for determining the sign of the result of the algebraical addition of the information coming from stage ADD with the contents supplied by the preceding operations, for a same channel, and stored in stage ACC. To take the multiplex operation into account, it is necessary that the accumulator knows the address of the processed signal at any time, which explains that the output of the counter is used to address the stage ACC. In fact, a better embodiment of the stage ACC, is obtained by the circuit arrangement of FIG. 8. The information E' coming from the stage ADD has "$n$" bits in parallel. It is transmitted to input "$a$" of an accumulator ACC1 the output of which goes through a shifting register SH under control of clock H2. Stage SH having eight word positions and the output of its last stage being re-applied to input "b" of stage ACC1, the latter performs the function of stage ACC, previously described and supplies to its output S, the wanted sign information. Then, the filtered delta coded signal is simply obtained by driving a trigger.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. A recursive digital filter comprising:

means for adapted to receive successive delta coded input signals $Y_N$, $Y_{N-1}$, $Y_{N-2}$, — $Y_{N-r-1}$;

output means for regenerating successive digital output signals $Z_N$, $Z_{N-1}$, $Z_{N-2}$, — $Z_{N-m-1}$;

means for storing digital signals at $2^N$ addressable memory locations, the stored signals being of the form $a_0Y_N + a_1y_{N-1} + a_2Y_{N-2}+—+a_{r-1}y_{N-r-1}+b_0Z_N+b_1Z_{N-1}—b_{m-1}Z_{N-m-1}$ where $a_0$, $a_1$–$a_r$ and $b_0$, $b_1$—$b_m$ are coefficient multipliers;

an accumulator for generating the output $Z_{N+1}=1$, if the sign $Z_N>0$, and the output $Z_{N+1} = 0$, if the sign $Z_N \leqslant 0$; and means jointly responsive to m successive delta coded input signals $Y$ and $r$ successive digital output signals $Z$ from the output means for extracting from the memory means the contents stored at the location whose address is defined by the m+r=N signals i.e., $y_N—y_{N-r-1}$; $Z_N—Z_{N-m-1}$ and for applying the extracted contents to the accumulator.

2. A recursive digital filter comprising:

means adapted to receive successive delta coded input signals $y_N$–$y_{N-r-1}$;

output means for regenerating successive digital output signals $Z_N$, $Z_{N-1}$, $Z_{N-2}—Z_{N-m-1}$;

a first and a second independent memory means for storing digital signals of the form $a_0y_N+—+a_ry_{N-r-1}$ and $b_0Z_N+—b_mZ_{N-m-1}$ respectively in $2^r$ and $2^m$ addressable memory locations, where $a_0$, $a_1$—$a_r$ and $b_0$, $b_1$—$b_m$ are coefficient multipliers;

accumulating means for generating the output $z_{N+1}$ = 1, if the sign $Z_N>0$, and the output $Z_{N+1}=0$, if the sign $Z_N \leqslant 0$;

first and second means respectively responsive to the $m$ delta coded input signals $Y$ and the $r$ digital output signals $Z$ for extracting from the respective first and second memory means the contents stored at locations whose addresses are defined by the respective $r$ and $m$ signals; and means for adding the extracted signals and for applying the extracted signals to the accumulating means.

* * * * *